United States Patent [19]

Albanesi

[11] Patent Number: 4,923,624

[45] Date of Patent: May 8, 1990

[54] LUBRICATING COMPOSITION ON POCKET-SIZED SUPPORT, SUITABLE TO BE SMEARED ON SLIDING SURFACES

[75] Inventor: Giancarlo Albanesi, Milan, Italy

[73] Assignee: Brico s.r.l., Meina, Italy

[21] Appl. No.: 112,719

[22] PCT Filed: Feb. 12, 1987

[86] PCT No.: PCT/EP87/00066

§ 371 Date: Sep. 22, 1987

§ 102(e) Date: Sep. 22, 1987

[87] PCT Pub. No.: WO87/05319

PCT Pub. Date: Sep. 11, 1987

[30] Foreign Application Priority Data

Mar. 5, 1986 [IT] Italy ................ 19644 A/86

[51] Int. Cl.$^5$ ............... C10M 129/68; C10M 159/06; C10M 111/02

[52] U.S. Cl. ......................... 252/10; 252/12; 252/56 R; 585/9; 585/10; 106/191; 106/271

[58] Field of Search ............ 252/10, 12; 585/9; 280/610; 106/191, 271; 206/812

[56] References Cited

U.S. PATENT DOCUMENTS

| | | | |
|---|---|---|---|
| 3,785,841 | 1/1974 | Beard | 106/271 |
| 3,965,519 | 6/1976 | Hermann | 206/812 |
| 4,093,268 | 6/1978 | Sampson et al. | 280/610 |
| 4,220,244 | 9/1980 | Elmore | 206/812 |
| 4,409,116 | 10/1983 | Lodico | 206/812 |
| 4,687,587 | 8/1987 | Daglish et al. | 585/9 |

FOREIGN PATENT DOCUMENTS

| | | |
|---|---|---|
| 426825 | 3/1926 | Fed. Rep. of Germany . |
| 131383 | 2/1929 | Switzerland . |
| 639619 | 11/1983 | Switzerland . |
| 640746 | 1/1984 | Switzerland . |

OTHER PUBLICATIONS

*The Condensed Chemical Dictionary;* 10th Ed., p. 1094.

*Primary Examiner*—Jacqueline V. Howard
*Attorney, Agent, or Firm*—Collard, Roe & Galgano

[57] ABSTRACT

Lubricating composition on the basis of waxy substances supported by means able to allow it to be applied by rubbing onto the bases of skis and the like, constituted by a blend formed by at least one hydrocarbon wax (ski-wax) dissolved in at least one solvent for said wax, said composition being absorbed by impregnation onto a flexible and porous support of paper, of fabric, of foamed resin and the like, of small dimensions, so to form an article able to transfer, by rubbing, said composition onto said soles and the like. Said solvent is preferably constituted by at least one hydrogenated naphthalene, such as decahydronaphthalene (decalin), or by mixtures of solvents containing at least 10% of decahydronaphthalene.

The article is then tightly sealed inside a waterproof package.

5 Claims, No Drawings

LUBRICATING COMPOSITION ON POCKET-SIZED SUPPORT, SUITABLE TO BE SMEARED ON SLIDING SURFACES

The present invention relates to a lubricating composition on the basis of hydrocarbon waxes (ski-waxes), absorbed on a flexible support of pocket format and particularly suitable to improve the characteristics of slipperiness and of water-repellency of the sliding surfaces to the sliding surfaces of skis, sledges, sliding devices and the like.

The use of ski-waxes on skis, sliding devices, and the like, to the purpose of increasing their slipperiness on snow, preventing snow from adhering on said soles, is known.

The ski-waxes presently more widely used for the present sliding surfaces of polymeric, and in particular polyethylenic, nature, are usually blends of paraffins and microcrystalline hydrocarbon waxes, variously formulated as a function of the types of snow, and of the environmental conditions under which it is used. In particular, for ski bases, and the like, linear or branched hydrocarbons having from about 12 to about 50 carbon atoms are preferably used, in as much as such hydrocarbons, thanks to their structure, are easily absorbed and/or adsorbed by the surface of the polyethylene base, in particular in its crystallite-free areas.

The application techniques for these ski-waxes generally comprise: either the high-temperature application (molten ski-wax), or the application at ambient temperature, by the smearing of ski-waxes in paste form, or by the spray application, by using dispersed ski-waxes. But the techniques of the prior art show, from a practical viewpoint, considerable drawbacks, above all as regards their poor practicalness of accomplishment by the amateur users, or by the users not provided with the necessary tools; that, because the melt techniques require the availability of equipment, and laborious operations; and the ambient-temperature techniques create encumbrances due to need of carrying cans, tubes, and the like, while the most customary conditions of application by the skier-users occur on the ski slopes, when the slipperiness of skis becomes insufficient because of the adherence of snow onto the ski soles.

Thus, a purpose of the present invention is to provide the skier-users, and the like, with a ski-waxing composition, suitably absorbed on a flexible support, of reduced dimensions, and tightly sealed inside of water-proof package, easily carried by the user with no hindrance with respect to ski-handling and the movements of the user, able to constitute an article of pocket format very handy and which is practical to be used.

Another purpose of the invention is to provide a pocket ski-waxing composition, the composition of which is such as to display optimum slipperiness characteristics, a low toxicity and a high degree of penetration into the polyethylenic ski base, said ski-waxing composition being supported by a flexible support and constituting a useful and practical article for the manual application of the ski-waxing blend onto the ski base, with the advantage that the same article can be thrown away soon after use.

These and still other purposes, which shall appear more clearly from the following detailed disclosure, are advantageously achieved by a lubricating composition on the basis of waxy substances, supported on means able to allow it to be applied, manually and at room temperature, to the ski base, to the sliding surfaces of sledges, sliding devices and the like, the composition of which is constituted, according to the present invention, by a blend comprising at least one hydrocarbon wax (ski-wax) and at least one suitable solvent for it, said composition being absorbed by impregnation on a flexible and porous support of small dimensions, able to transfer, by rubbing, said composition onto said sliding surfaces and the like. More particularly, said solvent comprises a hydrogenated naphthalene, preferably decahydronaphthalene (decalin), and said flexible support is selected from such fibrous materials as paper, fabrics and felts on the basis of natural, synthetic and artificial fibres, shaped as a serviette, small napkin, pad, sponge, stick, or the like, of small dimensions, so that an article of pocket format and sealable inside a water-tight, easily carried and highly practical-in-use package is obtained.

According to the invention, it has been practically observed that the best results are achieved by accomplishing a pocket article of minimum overall dimensions, preferably constituted by a small napkin of cellulosic material of dimensions of, e.g., 10–30 cm of side, suitably folded so to render it suitable to be conveniently packaged and carried, impregnated by said lubricating blend.

As an alternative, according to the invention said article can be constituted by a small wollen felt of, e.g., about 6×5 cm of dimensions and 3 mm of thickness, only partly (e.g., for about two thirds of its surface) impregnated by said lubricating blend, in as much as a wollen felt shows the advantage of developing a large amount of frictional heat during the application by rubbing, and a low rate of breaking up or deterioration during the application step. Furthermore, the partial impregnation of the support allows the not-impregnated portion to be used to the purpose of achieving a convenient applicability by hand, and to render uniform the spreading of the ski-waxing composition on the ski-soles, and the like.

Furthermore, it has also been observed that the best characteristics of ski-waxing valid for any snow types are obtained, according to the invention, with a ski-waxing composition comprising the following constituents:

(A) Paraffin waxes with dropping point 46°–48° C., or 54°–55° (or a mixture of both of them);
(B) Microcrystalline hydrocarbon waxes, preferably with dropping point 94°–95° C.;
(C) Decahydronaphthalene (decalin), or solvent blends containing at least 10% by weight of decahydronaphthalene;

The (A) and (B) constituents being present in a weight ratio, to each other comprised within the range of from 1:3 to 3:1, and the (C) constituent being present in said composition in an amount comprised within the range of from 30 to 95%, as referred to the total composition.

More particularly, said solvent blends on the basis of decahydronaphthalene may contain, as the diluent, one or more solvent(s), such as 1,1,1-trichloroethane, carbon tetrachloride, dichloroethane and the like.

(The dropping point corresponds to the "drop melting point" according to the well-known ASTM D127 Standard). Of course, also ski-waxes of traditional type can be used; these must however be formulated each time as a function of the snow type, with the amount of decalin or of decalin-based solvent blend having to be metered according to the ski-wax type. Decalin as solvent, according to the invention, offers the advantages of displaying: a low toxicity, a low flammability, due to its high boiling point, an optimum degree of penetration into the polyethylenic sole, with consequent good ski-wax transport, and a high airstream volatility. The subject article of the invention can be accomplished by the known manufacturing techniques; e.g., the suitably prearranged supports can be impregnated with the blend of hydrocarbon waxes, and related solvent, by injection, by dipping, by smearing, and the like; thus, furthermore, supports can be prepared in the form of a ribbon of constant thickness (of about 3 mm), they can be then impregnated either on one or on both of their faces according to the technique of roller-spreading, or the like, and can be subsequently subdivided into lengths of desired size (e.g., of 6×5 cm). The so-obtained article is then sealed inside a wrapper or package (envelope, bag, or the like) of waterproof material (plastics, waterproofed paper, metal film or the like), so to result sheltered, easily carried and to present a minimum encumbrance for the user, besides being easily openable and useable.

Obviously, in practice, the subject article of the invention can be accomplished by using supports of various nature and shape; in fact, besides paper tissues, small felts or flat fabric pads, supports of foamed resin, such as small sponges and the like, may be used, as well as stick-shaped supports, all of them being sealed inside a waterproof package.

I claim:

1. A ski-wax composition, comprising:
   (a) paraffin waxes;
   (b) microcrystalline hydrocarbon waxes; and
   (c) decahydronaphthalene (decalin), or a decalin-based solvent blend,
   the paraffin and microcrystalline hydrocarbon waxes being present according to a weight ratio to each other within the range of from 1:3 to 3:1, and the decalin or decalin-based solvent blend being present in said composition in an amount within the range of from 30% to 95%, as referred to the total weight.

2. The ski-wax composition according to claim 1, wherein said decalin-based solvent blend comprises from 10% to 100% by weight of decahydronaphthalene, the remaining being constituted by chlorinated solvents selecated from the group consisting of 1,1,1-trichlorethane, carbon tetrachloride and dichlorethane.

3. The ski-wax composition according to claim 1, wherein said paraffin waxes are selected from those having a dropping point of 46°–48° C. and a dropping point of 54°–55° C. and their blends.

4. The ski-wax composition according to claim 1, wherein said microcrystalline hydrocarbon waxes have a dropping point of 94°–95° C.

5. The ski-wax composition according to claim 1, wherein said composition is absorbed by impregnation into a pocket-size flexible and porous support selected from the group consisting of napkins of cellulosic material, felts of synthetic, natural or artificial fabric, foamed resins, natural or synthetic fibrous materials in the form of sticks, said pocket-size flexible and porous support impregnated with said ski-wax composition being packed inside a tightly-sealed and waterproof wrapping or package.

* * * * *